United States Patent

[11] 3,593,214

[72] Inventor Herbert Warren Cooper
Hyattsville, Md.
[21] Appl. No. 820,111
[22] Filed Apr. 29, 1969
[45] Patented July 13, 1971
[73] Assignee Westinghouse Electric Corporation
Pittsburgh, Pa.

[54] HIGH IMPEDANCE TRANSDUCER
6 Claims, 8 Drawing Figs.

[52] U.S. Cl. .......... 333/30, 310/8.1, 310/9.7
[51] Int. Cl. .......... H03h 9/30
[50] Field of Search .......... 333/6, 18, 30, 72; 330/5.5; 307/299; 310/8.2, 8.5

[56] References Cited

UNITED STATES PATENTS

| | | | |
|---|---|---|---|
| 3,479,572 | 11/1969 | Pokorny | 333/72 |
| 3,310,761 | 3/1967 | Brauer | 333/30 |
| 3,300,739 | 1/1967 | Mortley | 333/30 |
| 3,343,105 | 9/1967 | Vander Pauw | 333/30 |
| 3,289,114 | 11/1966 | Rowen | 333/30 |
| 3,401,360 | 9/1968 | Schulz-Du Bois | 333/30 |

*Primary Examiner*—Herman Karl Saalbach
*Assistant Examiner*—C. Baraff
*Attorneys*—F. H. Henson and E. P. Klipfel ABSTRACT: Various electrode structures are disclosed for reducing the capacitance between the electrodes of electromechanical transducers of the piezoelectric type. The electrode structures used thereby increase the impedance of such transducers so that a low loss match can be effected between the transducers and associated electromagnetic circuitry.

INVENTOR.
HERBERT WARREN COOPER
By Ernest P. Klipfel
Attorney

INVENTOR.
HERBERT WARREN COOPER
By
Ernest P. Klipfel
Attorney

HIGH IMPEDANCE TRANSDUCER

BACKGROUND OF THE INVENTION

1. Field of the Invention

This invention relates to electromechanical transducing means. More particularly, it relates to an array of discrete electromechanical transducer elements adapted to convert microwave frequency electrical wave energy into ultrasonic wave energy, and vice versa, and to delay lines employing such arrays.

2. Description of the Prior Art

It may be explained that electromechanical transducers for microwave acoustic delay lines generally comprise a body of piezoelectric material, such as cadmium sulfide, sandwiched between a pair of continuous electrodes. These transducers are made as thin as possible, and generally, are only of the order of microns in thickness for operation in the microwave frequency range. Because the transducers are very thin and because of the continuous nature of the electrodes, these transducers have a relatively high capacitance between the two electrodes. The capacitance between a pair of electrodes can be computed from the mathematical formula:

$$C=0.2246\ (KA/S)$$

where, $C=$ the capacitance in micromicrofarads;

$K=$ the dielectric constant;

$A=$ the area of the electrodes in square inches; and $S=$ the distance between the electrodes in inches.

From the above formula, it can be seen that as the area of the electrodes increases or the distance between them decreases, the capacitance increases. Because of the high capacitance between the two electrodes of such transducers, it follows that these devices are very low impedance devices especially as frequency increases. Likewise the acoustic radiation resistance of these transducers is extremely low so that the ohmic or loss resistance of electromagnetic circuitry normally associated with the transducers for applying electromagnetic voltages thereto is high. The extremely low radiation resistance of these transducers and its attendant difficulty in achieving a low loss match to electromagnetic circuits is the principal disadvantage of such transducers.

SUMMARY OF THE INVENTION

In accordance with the broad principles of the present invention, an overall object of the invention is to reduce the capacitance of such transducers and therefore increase the impedance thereof so that a low loss match can be effected between such transducers and associated electromagnetic circuitry.

The invention takes advantage of the fact that the capacitance between the electrodes can be reduced by either decreasing the area of the electrodes or increasing the spacing between them. With either expedient being utilized, the impedance of the transducer is increased.

Briefly, the present invention provides an array of discrete electromechanical transducing elements adapted to convert microwave frequency electrical wave energy into ultrasonic wave energy, and vice versa. The array is formed of a single body of piezoelectric material having opposite major faces with an electrode structure on each of the major faces. At least one of the electrode structures is constructed and arranged so as to have portions thereof in contact only with predetermined areas of one of the major faces such that only predetermined regions of the body of piezoelectric material have oppositely electroded areas. The arrangement is such that the oppositely electroded regions of the body of piezoelectric material define the individual electromechanical transducing elements of the array.

The above and other objects, features and advantages of the invention will become apparent from the following detailed description and from the accompanying drawings.

DESCRIPTION OF THE PREFERRED EMBODIMENTS

Figures 1, 2:
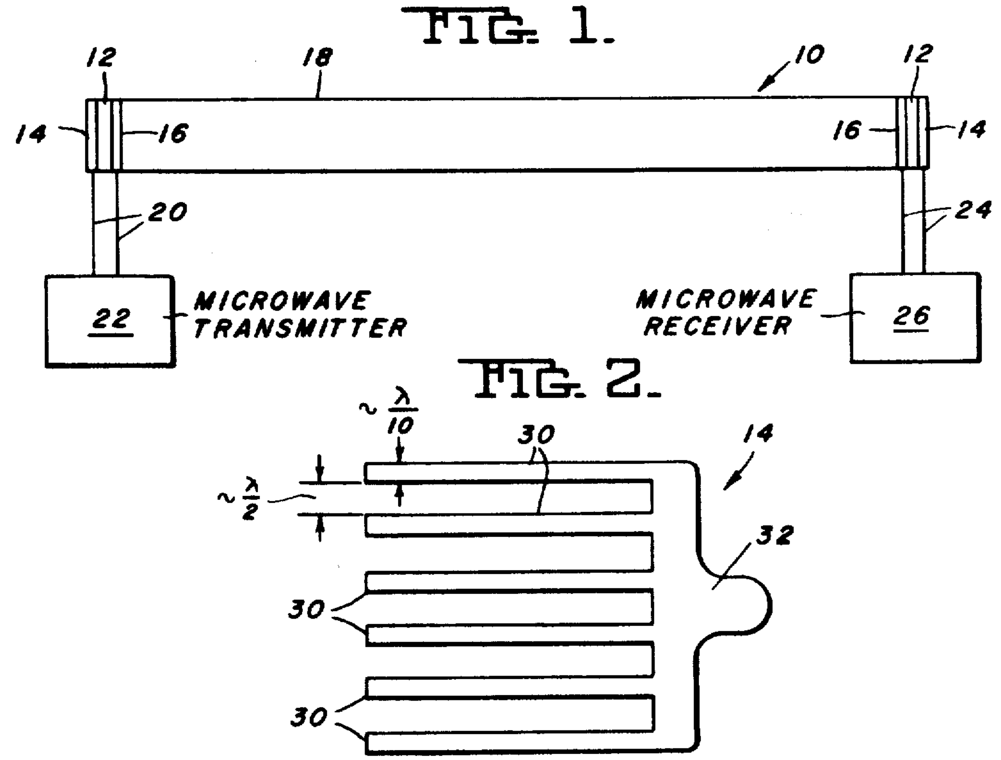
FIG. 1 illustrates a typical arrangement of the invention.
FIGS. 2 and 3 illustrate the construction of the top and bottom electrodes utilized in one embodiment of the invention.

Referring now to the drawings wherein like reference numerals refer to like parts throughout the several views, there is shown in diagrammatic form a delay line 10. Piezoelectric transducing crystals 12 of rectangular shape, equipped with conductive electrodes 14 and 16 on their oppositely disposed major faces, are cemented or otherwise secured to the left and right ends, respectively, of an ultrasonic transmission medium 18. The piezoelectric crystals 12 can be of any of the known materials which exhibit piezoelectric properties such as, for example, cadmium sulfide. The electrodes 14 and 16 of transducer 12 on the left are connected by the associated leads 20 to a source of microwave frequency electrical wave energy as represented, by way of example, by the microwave frequency transmitter 22. The electrodes 14, 16 of transducer 12 on the right are similarly connected by the associated leads 24 to a utilization circuit for microwave frequency electrical wave energy as represented by way of example by the microwave frequency receiver 26. Accordingly, the application of microwave frequency electrical wave energy to the electrodes 14, 16 of transducer 12 on the left by transmitter 22 results in the generation of ultrasonic waves of corresponding frequency which are launched in medium 18 and travel to the opposite or right end of medium 18 where the transducer 12 at the right end converts the ultrasonic waves back into electrical waves which are then carried by leads 24 associated with this transducer to the utilization device represented by microwave frequency receiver 26. Those skilled in the art will understand that the apparatus thus far described is conventional, as is its mode of operation.

Figure 3:
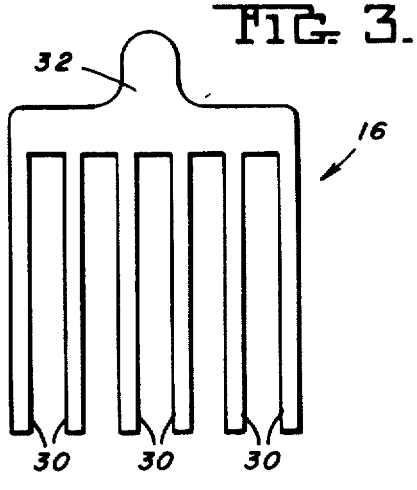
Figure 4:
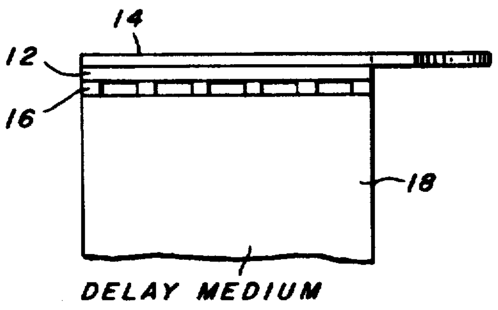
FIG. 4 illustrates an assembled transducer employing the electrodes shown in FIG. 1 in combination with one end of a partially shown delay line.
Figure 5:
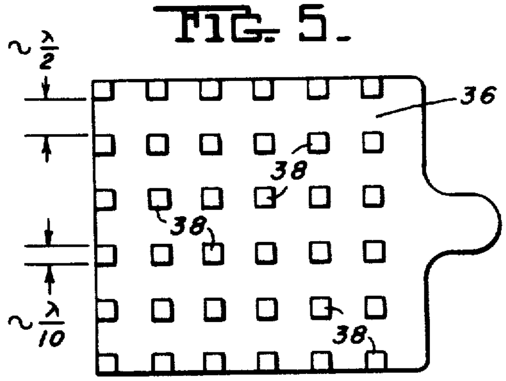
FIGS. 5 and 6 illustrate modified electrode structures in accordance with the invention.
Figure 6:
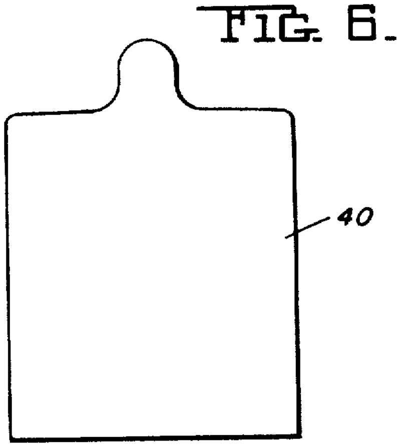

Important to the present invention is the geometry of the structure of electrodes 14 and 16. Referring now more particularly to FIGS. 2—4, one form for the electrodes 14, 16 is shown. For purposes of identification, the electrode illustrated in FIG. 2 will be hereinafter alternately referred to as the top electrode 14, and the electrode illustrated in FIG. 3 will be alternately referred to as the bottom electrode 16. However, either may be the top or bottom electrode. As shown, each of the electrodes 14, 16 has a plurality of spaced apart parallel portions 30 which are interconnected at at least one end by a terminal base portion 32 adapted for connection to external circuitry. By way of example, the spacing between the portions 30 can be approximately equal to one-half the wavelength of the applied microwave frequency electrical wave energy and the width of each may be approximately equal to one-tenth of the frequency wavelength. In assembling the transducers, the top electrode 14 is positioned on the layer of piezoelectric material 12 with the plurality of portions 30 thereof, orthogonally disposed with respect to the plurality of portions 30 of bottom electrode 16. With such an arrangement it can be seen that only predetermined areas of the respective upper and lower or major surfaces of the piezoelectric material 12 will be electroded. These regions of the piezoelectric material having oppositely electroded areas define an array of discrete electromechanical transducing elements which will convert applied microwave frequency electrical wave energy into ultrasonic wave energy and vice versa.

By reason of the geometry of the electrodes 14, 16 it can be seen that the area of the electrodes has been substantially reduced. Accordingly, from the above mathematical expression for capacitance it will be understood that the capacitance between the electrodes has been reduced. The effect of this is to increase the impedance of the transducers thereby providing a low loss match between the transducers and associated electromagnetic circuitry.

Of course, it will be understood that various techniques can be utilized in conjunction with the above so that both the inductance and resistance will not be substantially increased while the capacitance is being minimized. As for example, both ends of the portions 30 may be interconnected as opposed to just having them interconnected at one end by base portion 32 and this will reduce the series inductance and resistance presented by the extremely narrow line width of the portions 30. Alternately, the portions 30 can be made wider in nonoppositely electroded areas of the piezoelectric material and this will reduce the inductance and resistance between active areas of the piezoelectric material.

Figure 7:
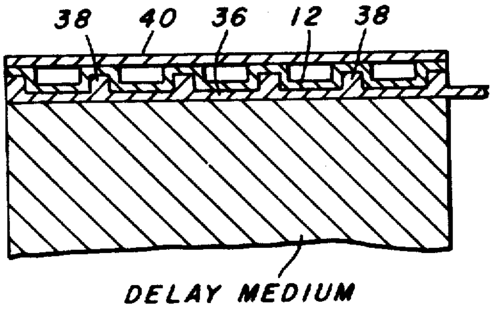
FIG. 7 illustrates in section an assembled transducer employing the electrode structure of FIG. 5 as the electrode closest to the delay line and the electrode structure of FIG. 6 as the opposite electrode.
Figure 8:
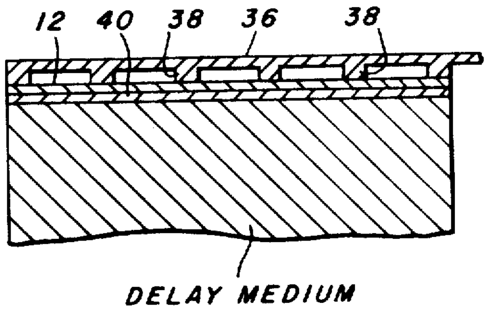
FIG. 8 illustrates in section an assembled transducer employing the electrode structure of FIG. 6 as the electrode closest to the delay line and the electrode structure of FIG. 5 as the opposite electrode.

Referring now to FIGS. 5—8, an alternative electrode structure for reducing the capacitance between the electrodes is shown. In the form of the invention shown in FIGS. 5—8, the spacing between the electrodes is effectively increased to provide the desired reduction in capacitance. The electrode structure illustrated in FIG. 5 comprises a flat conductive plate 36 having a plurality of raised portions 38 as best seen in FIGS. 7 and 8. Theelectrode structure shown in FIG. 5 can be either the top or bottom electrode as desired. In FIG. 7 it is utilized as the bottom electrode and in FIG. 8 it is utilized as the top electrode. The electrode structure illustrated in FIG. 6 comprises a flat conductive plate 40 and it too can be either the top or bottom electrode. In FIG. 7 it is utilized as the top electrode and in FIG. 8 as the bottom electrode. In FIG. 7, it can be seen that the piezoelectric layer 12 covers the bottom electrode or plate 36 and the raised portions 38, and the top electrode 40 is in contact with the layer 12 of piezoelectric material solely in the areas in which the portions 38 underlie the piezoelectric layer. As in the first described embodiment of the invention, the arrangement is such that only predetermined regions of the piezoelectric material have oppositely electroded areas with these predetermined regions defining the array of discrete electromechanical transducing elements.

Numerous and varied techniques, well known to those skilled in the art, can be utilized to fabricate the described electrode structures. Also, various "backing" or mechanical "impedance matching" techniques can be employed in conjunction with the invention. Further, numerous and varied other combinations of materials, delay lines and electrode structures can be readily devised by those skilled in the art within the spirit and scope of the principles of the present invention. No attempt to exhaustively cover all possible such combinations has been made.

I claim as my invention:

1. An array of discrete electromechanical transducer elements adapted to convert microwave energy into ultrasonic elastic wave energy, and vice versa, said array being formed of a single body layer of piezoelectric material elastically coupling said transducer elements, said transducer elements being in the form of spaced portions in said layer of piezoelectric material between electrode means in juxtaposed relation to the respective opposite sides of said piezoelectric layer, said electrodes being so configured in relation to each other that only spaced portions of said electrode means which are aligned transversely of said array are in juxtaposed relation to the opposite respective sides of said piezoelectric layer to form said discrete transducer elements and thereby reduce the total capacitance of said array.

2. In a delay line, the combination comprising
a. an ultrasonic transmission medium forming part of,
b. an array of discrete electromechanical transducing elements, said array of electromechanical transducer elements including a single body layer of piezoelectric material constituting said transmission medium elastically coupling said transducer elements, said transducer elements being in the form of spaced portions in said layer of piezoelectric material between electrode means in juxtaposed relation to the respective opposite sides of said piezoelectric layer, said electrodes being so configured in relation to each other that only spaced portions of said electrode means which are aligned transversely of said array are in juxtaposed relation to the opposite respective sides of said piezoelectric layer to form said discrete transducer elements and thereby reduce the total capacitance of said array.

3. In a delay line, the combination comprising
a. an ultrasonic transmission medium,
b. a first electrode structure in contact with said medium and having a plurality of raised portions thereon,
c. a layer of piezoelectric material overlying said first electrode structure and said raised portions thereof, and
d. a second electrode structure in contact with said piezoelectric material solely in the areas in which said raised portions of said first electrode structure underlie said piezoelectric material, the arrangement being such that only predetermined regions of said piezoelectric material have oppositely electroded areas with said predetermined regions defining an array of discrete electromechanical transducing elements.

4. In a delay line, the combination comprising
a. an ultrasonic transmission medium,
b. a first electrode structure in contact with said medium,
c. a layer of piezoelectric material overlying said first electrode structure, and
d. a second electrode structure having a plurality of raised portions, said raised portions only of said second electrode structure being in contact with predetermined areas of said layer of piezoelectric material such that only predetermined regions of said layer have oppositely electroded areas, said oppositely electroded predetermined regions defining an array of discrete electromechanical transducing elements.

5. In a delay line, the combination comprising
a. an ultrasonic transmission medium,
b. a first electrode structure in contact with said medium, said first electrode structure having a plurality of spaced apart parallel portions which are interconnected at at least one end by a terminal base portion,
c. a layer of piezoelectric material overlying said first electrode structure, and
d. a second electrode structure in contact with said layer of piezoelectric material, said second electrode structure having a plurality of spaced apart parallel portions which are interconnected at one end by a terminal base portion, said second electrode structure being positioned on said layer of piezoelectric material with the plurality of spaced parallel portions thereof being orthogonally disposed with respect to the plurality of spaced parallel portions of said first electrode structure such that only predetermined regions of said layer of piezoelectric material have oppositely electroded areas, said oppositely electroded predetermined regions defining an array of discrete electromechanical transducing elements.

6. The array as set forth in claim 1 in which said transformer elements are spaced from each other by a distance equal to approximately one-half wavelength of the acoustic wavelength in said medium.